US012746903B2

(12) United States Patent
Adams et al.

(10) Patent No.: US 12,746,903 B2
(45) Date of Patent: Sep. 29, 2026

(54) METHOD FOR PRODUCING A GEAR SHAFT, GEAR SHAFT FOR AN ELECTRICALLY OPERATED BRAKE BOOSTER AND BRAKE BOOSTER

(71) Applicant: ZF Active Safety GmbH, Koblenz (DE)

(72) Inventors: Karl-Josef Adams, Muenstermaifeld (DE); Abdallah Ibrahim, Urmitz (DE); José Manuel Calvo Martinez, Kruft (DE); Martin Hofmann, Mendig (DE); Kurt Wingender, Hartenfels (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 18/538,589

(22) Filed: Dec. 13, 2023

(65) Prior Publication Data

US 2024/0208478 A1 Jun. 27, 2024

(30) Foreign Application Priority Data

Dec. 23, 2022 (DE) ......................... 102022134795.8

(51) Int. Cl.
*B60T 13/74* (2006.01)
*F16H 57/00* (2012.01)

(52) U.S. Cl.
CPC ........ *B60T 13/745* (2013.01); *F16H 57/0025* (2013.01); *F16H 57/0031* (2013.01)

(58) Field of Classification Search
CPC ............................. B60T 13/74; F16H 57/0025
See application file for complete search history.

(56) References Cited

U.S. PATENT DOCUMENTS 3,281,925 A * 11/1966 Hanna ...................... B21H 5/02 72/203
5,715,901 A 2/1998 Tokushima
(Continued)

FOREIGN PATENT DOCUMENTS

DE 4414664 A1 * 11/1995 ............. B23K 26/20
DE 19620330 A1 11/1997
(Continued)

OTHER PUBLICATIONS

Translation of DE_102022205407_A1 (Year: 2023).*
(Continued)

*Primary Examiner* — Jacob J Cigna
(74) *Attorney, Agent, or Firm* — Kristin L. Murphy

(57) ABSTRACT

A method for producing a gear shaft for an electromechanical brake booster having an electric motor and having a rotation/translation conversion gear, which converts a rotating drive movement of the electric motor into a linear movement for actuating a piston-cylinder unit for generating a hydraulic brake pressure, is provided, according to which a force transmission element is provided. A rotationally-symmetrical gearing is integrally formed on a drive-side end of the force transmission element. A positioning and fastening device is formed on the force transmission element at the output side, and a gearwheel is anchored on the force transmission element in a rotationally fixed manner by the positioning and fastening device. A gear shaft and a brake booster are also disclosed.

8 Claims, 2 Drawing Sheets

(56) References Cited

U.S. PATENT DOCUMENTS

| | | | | |
|---|---|---|---|---|
| 2010/0166511 | A1* | 7/2010 | Frecska | B23F 21/206<br>407/42 |
| 2018/0273011 | A1 | 9/2018 | Wingender et al. | |
| 2023/0070222 | A1* | 3/2023 | Nagel | B60T 13/686 |

FOREIGN PATENT DOCUMENTS

| | | | | | |
|---|---|---|---|---|---|
| DE | 102008043488 | A1 | | 6/2009 | |
| DE | 102022205407 | A1 | * | 11/2023 | B60T 13/745 |
| JP | 2004316823 | A | * | 11/2004 | |
| WO | WO-2007139048 | A1 | * | 12/2007 | B21D 39/00 |

OTHER PUBLICATIONS

Seger, Dan,. Inside Splines. Gear Solutions. [retrieved on Jan. 22, 2026]. Retrieved from the internet URL <https://gearsolutions.com/features/inside-splines/> (Year: 2005).*

* cited by examiner

METHOD FOR PRODUCING A GEAR SHAFT, GEAR SHAFT FOR AN ELECTRICALLY OPERATED BRAKE BOOSTER AND BRAKE BOOSTER

CROSS-REFERENCE TO RELATED APPLICATION

This application claims priority to German Priority Application No. 102022134795.8, filed Dec. 23, 2022, the disclosure of which is incorporated herein by reference in its entirety.

TECHNICAL FIELD

The disclosure relates to a method for producing a gear shaft, for example for an electrically operated brake booster, such as for a brake system of a car. The disclosure also relates to a gear shaft for an electrically operated brake booster and a brake booster for a brake system in a car.

BACKGROUND

A electromechanical brake booster is known from DE 10 2007 018 469 A1. The known brake booster comprises an electric motor having a rotation/translation conversion gear, which converts a rotating drive movement of the electric motor into a linear movement for actuating a master brake cylinder, and a mechanical gear with a variable transmission ratio, A method for producing a threaded part of a cylindrical screw drive for an electromechanical brake booster is known from DE 10 2011 081 966 A1.

A further electromechanical brake booster having an electric motor and a rotation/translation conversion gear is known from DE 10 2015 0 12 124 A1.

SUMMARY

What is needed is to overcome the disadvantages of the prior art, and to provide a method for producing a gear shaft for an electromechanical brake booster, a gear shaft and an electromechanical brake booster, which enable cost-effective manufacture and usability in different vehicle series with high dimensional accuracy of the components.

According to a first aspect of the disclosure, a method for producing a gear shaft for an electromechanical brake booster having an electric motor and having a rotation/translation conversion gear, which converts a rotating drive movement of the electric motor into a linear movement for actuating a piston-cylinder unit for generating a hydraulic brake pressure, is provided, according to which a force transmission element is provided. A rotationally-symmetrical gearing is integrally formed on a drive-side end of the force transmission element; a positioning and fastening device is formed on the force transmission element at the output side, and a gearwheel is anchored on the force transmission element in a rotationally fixed manner by the positioning and fastening device.

According to one exemplary arrangement, at least a lateral surface of the force transmission element is chemically and/or thermally treated, at least in some portions. In a rotationally symmetrical force transmission element, such as a cylindrical shaft, the term lateral surface refers to the outer circumferential surface of the rotationally symmetrical body. For example, at least the lateral surface of the force transmission element is hardened, for example before the positioning and fastening device is formed. In another variant, the positioning and fastening device is formed and only then is the force transmission element, for example including the positioning and fastening device, chemically and/or thermally treated, for example hardened.

According to one exemplary arrangement, a fastening aid for a bearing and/or a positioning device is formed on the force transmission element. For example, the fastening aid is incorporated by cutting, such as in a turning process. Multiple fastening aids may also be incorporated. A fastening aid may be configured as a narrowing, a recess or a projection, and may, comprise an undercut.

According to one exemplary arrangement, an axial positioning device is formed on the force transmission element such that it is fixed against axial displacement, or—if a fastening aid is provided—it is anchored on the fastening aid. For example, the axial positioning device is brought into form-fitting engagement with the force transmission element.

According to one exemplary arrangement, a lateral surface of the force transmission element is machined by cutting and/or abrasion, at least in some portions, before the gearwheel is anchored in a rotationally fixed manner with respect to the force transmission element. For example, the force transmission element is moved past a grinding tool along its entire length in the direction of the longitudinal extent of the force transmission element. In one exemplary arrangement, the grinding tool is only brought into abrasive contact with the force transmission element in certain regions along its entire length.

According to one exemplary arrangement, the positioning and fastening device is formed, for example, by shaping the force transmission element in a material-preserving manner. The force transmission element may be notched. An impact tool may be used here.

According to one exemplary arrangement, a shaping tool for forming the positioning and fastening device is moved such that the direction in which its shaping force is introduced intersects a direction of extent of the force transmission element which points away from an axis of rotation of the force transmission element. It is thus ensured that a shaping tool, such as an impact tool, shapes material in a predetermined direction, e.g. it generates a material elevation which may serve as an anchoring projection.

According to one exemplary arrangement, the gearwheel and the positioning and fastening device are brought into friction-fitting and/or form-fitting engagement with one another, for example directly, during the pushing-on procedure. Engagement between complementary forms is preferably realized, e.g. as a result of elastic-plastic deformation. In particular, during the pushing-on of the gearwheel, an anchoring recess is formed in the gearwheel, i.e. in a shaft-receiving opening of the gearwheel, by the positioning and fastening device—e.g. a projection or a rib—as a result of elastic-plastic deformation, plastic deformation and/or cutting.

According to one exemplary arrangement, an axial bearing is at least partly formed on an output-side end of the force transmission element. For example, the axial bearing end is produced by cutting, e.g. by turning and/or grinding. The axial bearing end may be hardened.

According to one exemplary arrangement, a recess is formed in an axial bearing end opposite the gearing on the drive-side end of the force transmission element, and a component forming an axial bearing contact is fastened in the recess.

According to a further aspect of the disclosure, a gear shaft for an electromechanical brake booster comprises a force transmission element having a gearing end for tapping off a drive torque and a gearwheel for imparting an output torque. According to the disclosure, a positioning and fastening device for the gearwheel is formed in one piece with the force transmission element.

According to one exemplary arrangement, the gear shaft comprises two bearing portions, for example radial bearing portions, with which a radial bearing is in engagement in each case.

According to one exemplary arrangement, the gear shaft comprises a removable and/or separately manufactured axial positioning device for fixing the position of the gear shaft in the electromechanical brake booster with respect to a drive side. For example, a fastening aid for the axial positioning device is provided, which fastening aid is formed in one piece with the force transmission element.

According to one exemplary arrangement, the fastening and positioning device has a material or lateral-surface elevation and/or depression, for example with respect to the outer circumference of the force transmission element. In one exemplary arrangement, multiple lateral-surface elevations and/or depressions, arranged rotationally symmetrically around the force transmission element, are provided. For example, the lateral-surface elevations and/or depressions extend in the direction of the longitudinal extent of the force transmission element such that they are parallel to the axis of rotation.

According to an exemplary arrangement, the force transmission element has an axial bearing end opposite the gearing end, for example in the axial direction of extent, for tapping off a drive torque. In one exemplary arrangement, the axial bearing end is formed in one piece with the force transmission element. For example, the axial bearing end has a fastening aid, in which a component forming an axial bearing contact is received. The component forming the axial bearing contact may be a hardened steel ball.

According to one exemplary arrangement, the gear shaft is produced according to the method according to the disclosure. For example, the positioning and fastening device comprises an anchoring between the gearwheel and the force transmission element, which anchoring is fixed against rotation and/or axial thrust.

According to a further aspect of the disclosure, an electromechanical brake booster is provided, having an electric motor and having a rotation/translation conversion gear, which converts a rotating drive movement of the electric motor into a linear movement for actuating a piston-cylinder unit for generating a hydraulic brake pressure. According to the disclosure, the rotation/translation conversion gear comprises a gear shaft according to the disclosure and/or which is produced according to the disclosure.

One or more aspects of the disclosure are advantageous in that the gear shaft may be manufactured in a simple and cost-effective manner. One or more aspects of the disclosure are advantageous in that functional constituent parts may be manufactured in at least partly separate manufacturing steps, whereby manufacturing flexibility, scalability and dimensional accuracy may be improved. One or more aspects of the disclosure are advantageous in that the processing of certain functional components is already completed before further processing steps ensue, so that fixed processing reference points, such as reference dimensions, are available for subsequent steps. One or more aspects of the disclosure are advantageous in that regions of the components to be manufactured or the manufactured components are not sensitive to external influences in later manufacturing steps. One or more aspects of the disclosure are advantageous in that functional constituent parts are manufactured in one piece from a semi-finished product, whereby the handling labour is reduced and the force transmission within the component may be improved.

BRIEF DESCRIPTION OF DRAWINGS

Further features, advantages and properties of the disclosure are explained with the aid of the description of exemplary arrangements of the disclosure and with reference to the figures, in which.

DETAILED DESCRIPTION

Figure 1:
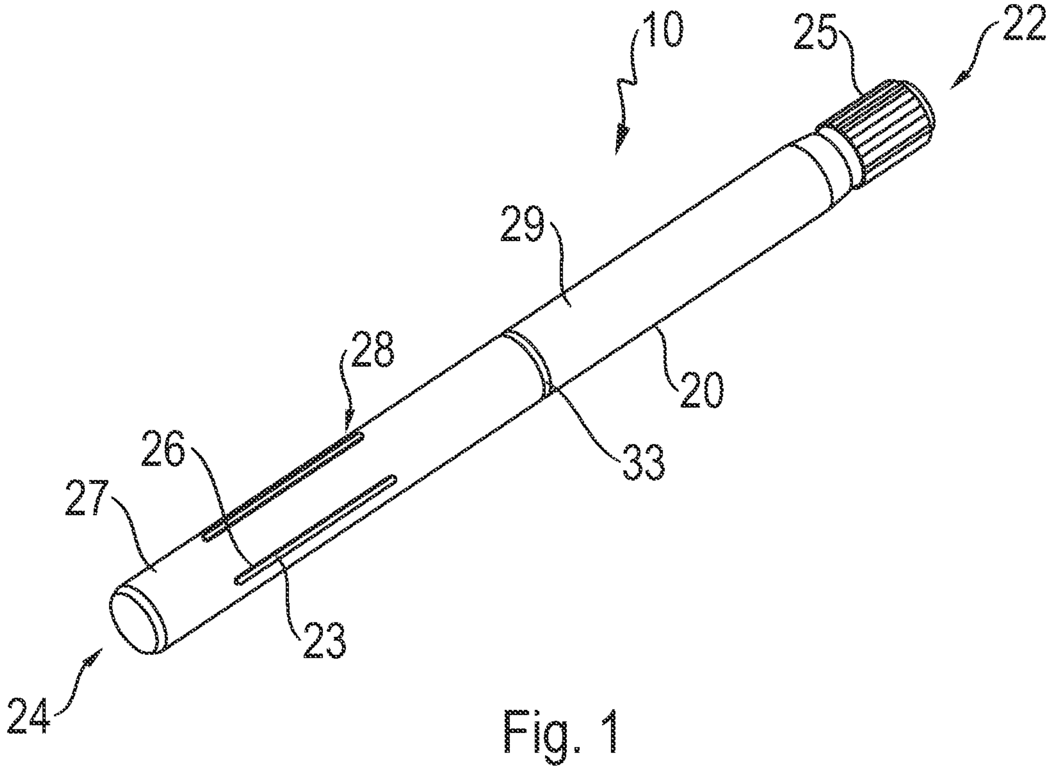
FIG. 1 shows a force transmission element of a gear shaft according to a first exemplary arrangement of the disclosure.

FIG. 1 shows a force transmission element 20, which serves as a prefabricated component for producing a gear shaft 10 for an electromechanical brake booster. To form a gear shaft 10, a gearwheel 30 (illustrated in FIGS. 2 and 3) is mounted on the force transmission element 20 such that it comes into engagement with a further gearwheel of the brake booster. The force transmission element 20 is manufactured from a substantially rotationally symmetrical metallic semi-finished product, such as a cylindrical steel shaft. The force transmission element 20 extends along an axis of rotation (not illustrated) from a drive-side end 22 to an output-side axial bearing end 24.

At the drive-side end 22, a gearing end 25 is incorporated in the force transmission element 20 by cutting. In the final installed state, the gearing end 25 is connected to the output of an electric motor (not illustrated in more detail) of an electromechanical brake booster via a clutch 37 (illustrated in FIG. 2).

At the output-side axial bearing end 24, the force transmission element 20 is supported axially in a housing 3 (partly illustrated in FIG. 2) of an electromechanical brake booster 1. For this purpose, a bearing shell 36 is provided in the housing 3.

Between the drive-side end 22 and the output-side axial bearing end 24, two regions of the force transmission element 20 are produced in a manufacturing process as bearing portions 27, 29, such that that they may be brought into engagement with a radial bearing 34, 32 (illustrated in FIG. 2) in each case. The force transmission element 20 is supported radially in the housing 3 of the electromechanical brake booster 1 via the radial bearings 34, 32. The bearing portion 27 is manufactured directly adjacent to the axial bearing end 24, for example along approximately 3 percent to 7 percent of the longitudinal extent of the force transmission element 20. The bearing portion 29 is formed approximately centrally, albeit offset somewhat to the drive-side end 22, such as along approximately 5 to 12 percent of the longitudinal extent of the force transmission element 20. The bearing portions 27, 29 may be formed by a grinding tool. To achieve a high load-bearing capacity of the radial bearing of the force transmission element 20, the bearing portions 27, 29 are moreover hardened, for example, using a thermal method. In other variants, chemical methods may be used to achieve the desired surface qualities and the hardness grade of the bearing portions 27, 29.

A positioning and fastening device 28 for a gearwheel (not illustrated in FIG. 1) is formed in close proximity to the bearing portion 27. The positioning and fastening device 28 comprises at least one rib 26, which is formed in one piece with the force transmission element 20. In the exemplary arrangement shown, the rib 26 is generated by shaping the force transmission element 20. The at least one rib 26 can be produced in a simple manner by impact work. For this purpose, an impact tool is moved in such a way that the direction in which the force is introduced intersects the radial directions of extent of the force transmission element 20. Using this measure, it is achieved that, upon an impact caused by the impact tool, material of the force transmission element 20 is shaped plastically such that the at least one rib 26 is produced, as well as a notch 23. For further ribs 26 and notches 23, which are shown in varying numbers in FIGS. 1 and 2, the process is repeated as the force transmission element 20 continues to rotate accordingly. Alternatively, or in addition, the positioning and fastening device 28 is incorporated by cutting.

Figure 3:
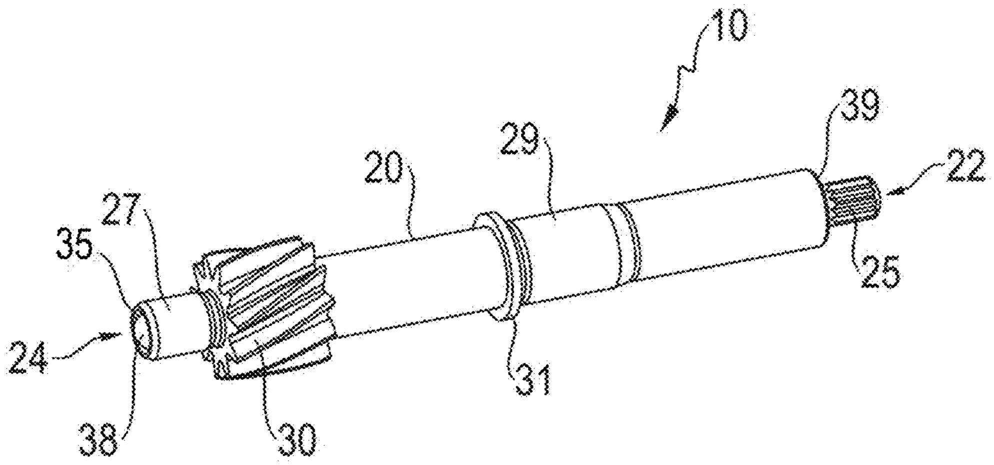
FIG. 3 shows a gear shaft according to a second exemplary arrangement of the disclosure.

Between the two bearing portions 27, 29, on the side of the bearing portion 29, a narrowing 33 is formed in the force transmission element 20, which narrowing serves as a fastening aid for an axial positioning device 31, which can be seen, for example, in FIG. 3. The narrowing 33 is formed by cutting, e.g. by turning.

Figure 2:
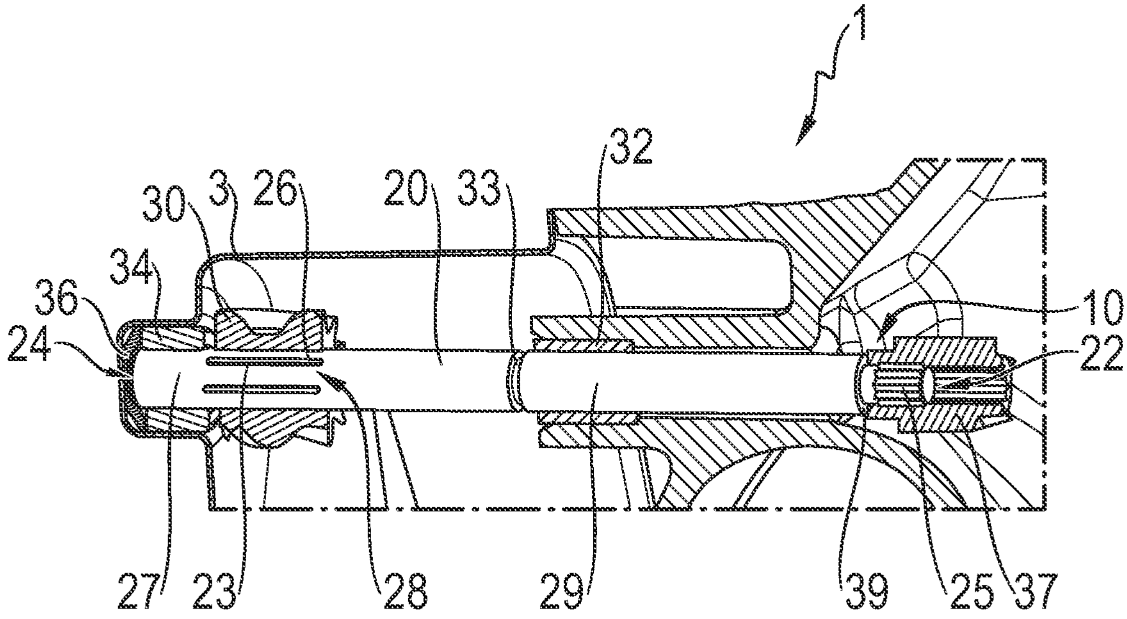
FIG. 2 shows a detail of an electromechanical brake booster according to the disclosure, having a gear shaft according to the first exemplary arrangement of the disclosure.

In FIG. 2, the force transmission element 20 is shown substantially according to FIG. 1, which force transmission element forms a pre-installed gear shaft 10 after an output-side gearwheel 30 has been fitted. The gear shaft 10 is finally installed in a housing 3 of an electromechanical brake booster 1 (not illustrated in more detail). To form the gear shaft 10, the gearwheel 30 is pushed onto the force transmission element 20 until it is in full engagement with the positioning and fastening device 28. The longitudinal extent and arrangement of the positioning and fastening device 28 on the force transmission element 20 serve here for precise positioning relative to a further gearwheel which is to be brought into engagement with the gearwheel 30.

In one variant, during the pushing-on procedure, the at least one rib 26 of the positioning and fastening device 28 acts in a cutting, abrasive, elastically deforming and/or plastically deforming manner in the shaft receiving opening of the gear wheel 30, so that rotationally fixed and/or axially fixed anchoring is realized after the pushing-on procedure. The at least one rib 26 and the shaft receiving opening may be matched to one another in terms of their dimensions such that a gearwheel-side part of the positioning and fastening device 28 is formed during the pushing-on procedure.

In another exemplary variant, the shaft receiving opening of the gearwheel 30 has at least one recess and/or at least one projection, which correspond to the at least one rib 26 and/or the at least one notch 23, so that a positioning and fastening device 28 is formed by latching elements on the gearwheel 30 and the force transmission element 20, which latching elements are prefabricated with complementary forms.

At the drive-side end 22, the drive force is imparted to the gear shaft 10 via a clutch 37 from the output end of an electric motor or a gear portion which is connected to the electric motor such that it is in closer proximity to the source within the drive train than the force transmission element. The gearing end 25 is formed with a smaller circumference or radius than the force transmission element 20 such that the force transmission element 20 forms an axial end stop 39 for the clutch 37.

The gear shaft 10 is supported radially on the radial bearings 32, 34, which are in engagement with the bearing portions 29, 27. The radial bearings 32, 34 are designed as ball or roller bearings, for example as needle bearings. In one exemplary arrangement, in the region of the respective bearing portion 29, 27, an inner bearing surface of the bearing is formed by the lateral cylinder surface or the outer circumferential surface of the force transmission element 20.

In terms of its function and production, the gear shaft 10 shown in FIG. 3 corresponds to the gear shaft 10 shown in FIG. 2—which has the force transmission element 20 shown in FIG. 1—and differs simply in that an axial positioning device 31 is provided in the region having the narrowing 33 in FIGS. 1 and 2 and the axial bearing end 24 is configured as an alternative variant.

To form an axial positioning device 31, a snap ring is pushed onto the narrowing 33 with elastic deformation. With regard to the dimensions of the narrowing 33 in the longitudinal direction of extent and the radial direction of the force transmission element 20, the snap ring is dimensioned such that a position-defining axial stop is formed. The axial positioning device is formed after forming the bearing surfaces 27, 29, which facilitates the manufacture thereof.

In the exemplary arrangement according to FIG. 3, the axial bearing end 24 comprises a recess 35, which forms a fastening aid and is incorporated in the output-side end of the force transmission element 20 by cutting, for example by turning. A hardened steel ball 38 is pressed into the recess 23 and produces an axial bearing contact with a housing-side bearing shell 36. The recess is dimensioned and configured such that it holds the hardened steel ball 38 in place in a pre-installed state.

The invention claimed is:

1. A gear shaft for an electromechanical brake booster, comprising:

a force transmission element having a gearing end for tapping off a drive torque, wherein a gearing is integrally formed on the gearing end, and a gearwheel for imparting an output torque, wherein the gear shaft comprises a positioning and fastening device for the gearwheel, which positioning and fastening device is formed in one piece with the force transmission element on a portion of the force transmission element and includes at least one rib, wherein the gear shaft has a removable and/or separately manufactured axial positioning device positioned about the gear shaft for fixing a position of the gear shaft in the electromechanical brake booster with respect to a drive side, wherein, a fastening aid for the axial positioning device is provided, which fastening aid is formed in one piece on an outside surface of the force transmission element.

2. The gear shaft according to one of claim 1, wherein the positioning and fastening device has a lateral surface elevation and/or depression in the force transmission element.

3. The gear shaft according to claim 1, wherein the force transmission element has an axial bearing end opposite the gearing end for tapping off a drive torque, which axial bearing end is formed in one piece with the force transmission element or has a fastening aid in which a component forming an axial bearing contact is received.

4. The gear shaft according to claim 1, wherein the positioning and fastening device forms an anchoring between the gear wheel and the force transmission element, which anchoring is fixed against rotation and/or axial thrust.

5. The gear shaft according to claim 1, wherein the gear shaft comprises two bearing portions, with which a radial bearing is in engagement in each case.

6. The gear shaft according to claim 5, wherein the gear shaft has a removable and/or separately manufactured axial positioning device for fixing a position of the gear shaft in the electromechanical brake booster with respect to a drive side, wherein, a fastening aid for the axial positioning device is provided, which fastening aid is formed in one piece with the force transmission element.

7. The gear shaft according to claim 5, wherein the positioning and fastening device has a lateral surface elevation and/or depression in the force transmission element.

8. An electromechanical brake booster (1), comprising an electric motor and having a rotation/translation conversion gear, which converts a rotating drive movement of the electric motor into a linear movement for actuating a piston-cylinder unit for generating a hydraulic brake pressure, wherein the rotation/translation conversion gear comprises a gear shaft according to claim 1.

* * * * *